US005987943A

United States Patent [19]

Verga et al.

[11] Patent Number: 5,987,943

[45] Date of Patent: Nov. 23, 1999

[54] LOCKABLE ENDGATE FOR A PICKUP TRUCK

[75] Inventors: Charles Frederick Verga, Holly; Tony Santiago, Inkster; Joachim Diestel, Flushing; Amit Marwah, Southfield; Michael L. Burton, Durand, all of Mich.

[73] Assignee: General Motors Corporation, Detroit, Mich.

[21] Appl. No.: 09/066,498

[22] Filed: Apr. 24, 1998

[51] Int. Cl.[6] .................... B60R 25/02

[52] U.S. Cl. .................... 70/208; 292/DIG. 31; 292/DIG. 43

[58] Field of Search .................... 70/208, 209; 292/DIG. 42, 292/43, 31, 336.3

[56] References Cited

U.S. PATENT DOCUMENTS

| | | | |
|---|---|---|---|
| 3,550,412 | 12/1970 | Pitel et al. | 70/208 X |
| 4,143,904 | 3/1979 | Cooper et al. | 296/57.4 |
| 4,850,209 | 7/1989 | Weinerman et al. | 70/208 |
| 4,911,487 | 3/1990 | Rachocki | 70/208 X |
| 4,951,486 | 8/1990 | Braun et al. | 70/208 |
| 4,969,916 | 11/1990 | Weinerman et al. | 70/208 |
| 5,004,287 | 4/1991 | Doyle | 295/57.1 |
| 5,104,171 | 4/1992 | Johnsen et al. | 296/50 |
| 5,127,686 | 7/1992 | Gleason et al. | 70/208 X |
| 5,172,946 | 12/1992 | Dowling | 292/DIG. 43 X |
| 5,265,450 | 11/1993 | Doyle | 70/118 |
| 5,303,971 | 4/1994 | Johnsen et al. | 296/50 |
| 5,340,174 | 8/1994 | Bender et al. | 70/208 X |
| 5,439,260 | 8/1995 | Weinerman et al. | 70/208 X |
| 5,443,292 | 8/1995 | Shimada et al. | 292/DIG. 43 X |
| 5,556,145 | 9/1996 | Takasaki | 70/208 X |
| 5,595,076 | 1/1997 | Weinerman et al. | 70/208 |

*Primary Examiner*—Suzanne Dino Barrett
*Attorney, Agent, or Firm*—Jeffrey A. Sedlar; Kathryn A. Marra

[57] ABSTRACT

A lockable endgate for a pickup truck includes a lift handle assembly mounted within the endgate for releasably securing the endgate in a closed position. The lift handle assembly includes a lift handle actuating a pair of handle pawls which translate a pair of latching mechanisms thereby releasing the endgate from the closed position. The lockable endgate further includes a bezel mounted on the outer panel having an access hole for the lift handle to extend through. A key actuated locking cylinder is mounted to the bezel and includes a locking pawl which prevents the actuation of the handle pawls in the locked position. A rigid close out plate is also included which mounts between the locking pawl and the bezel.

7 Claims, 3 Drawing Sheets

LOCKABLE ENDGATE FOR A PICKUP TRUCK

TECHNICAL FIELD

This invention relates generally to a locking device for a vehicle. In particular, this invention relates to a lockable endgate for a pickup truck.

BACKGROUND OF THE INVENTION

It is well known in the design and manufacture of pickup trucks to include an endgate to provide access to the bed of the pickup truck. The endgates are typically attached to the body of the truck and opened and closed about an axis defined by a pair of hinges. The typical endgate is held closed in a vertical position by a pair of latching mechanisms actuated by a latch handle assembly centrally located in the outside face of the endgate. The latch handle assembly is typically a pull type handle attached to a pair of pawls which articulate during operation of the handle to displace a pair of latch rods attached to the latching mechanisms thereby allowing the opening of the endgate. Locking devices for truck endgates are known in the art.

SUMMARY OF THE INVENTION

This invention offers advantages and alternatives over the prior art by providing an aesthetically appealing lockable endgate. It is an object of the present invention that the lockable endgate be retrofittable or installable in a variety of endgates. The lockable endgate preferably includes a key activated pawl incorporated into an endgate handle assembly to prevent actuation of the handle when in a locked position. The preferred lockable endgate advantageously includes a rigid closeout bracket to cover the locking system.

The above discussed and other features and advantages of the present invention will be appreciated and understood by those skilled in the art from the following detailed description and drawings.

BRIEF DESCRIPTION OF THE DRAWINGS

The present invention will now be described, by way of example only, with reference to the accompanying drawings wherein like elements are numbered alike in the several Figures.

DESCRIPTION OF THE PREFERRED EMBODIMENT

Figure 1:
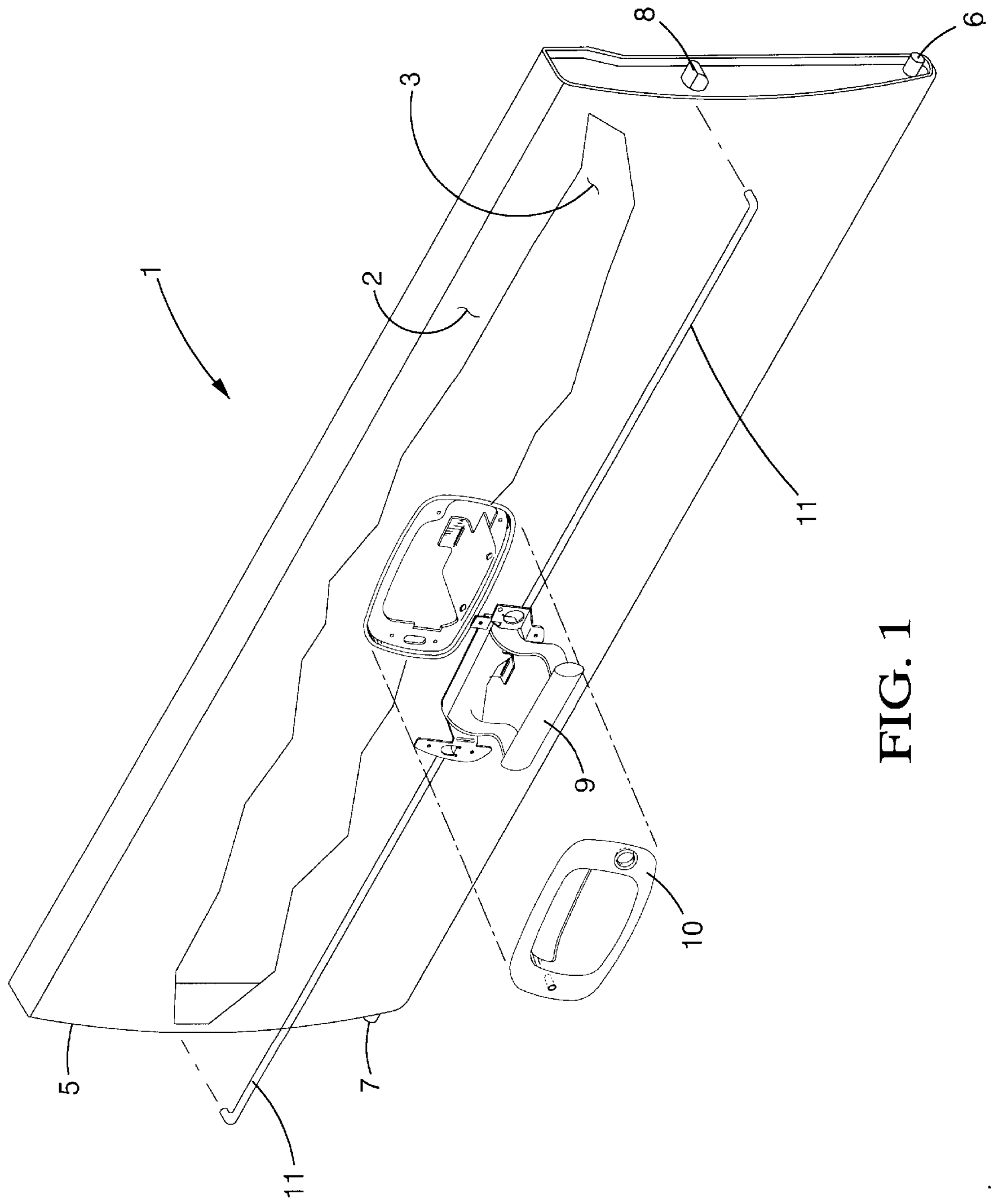
FIG. 1 is an isometric view in partial section of a lockable endgate.

Referring to FIG. 1 there is shown a lockable endgate, generally designated as 1. The endgate 1 is generally installed at the rear of a cargo bed of a pickup truck, as is well known. Endgate 1 has an outer panel 2, and an inner panel 3 with opposing ends 4, 5 and is rotated about a pair of hinges 6, 7 between a horizontal open position and a vertical closed position. Hinges 6, 7 extend from sides 4, 5 respectively, of endgate 1. The endgate 1 is held in the closed position by the engagement of a pair of spring biased plungers 8 within receivers (not shown) in the pickup truck body, as is well known. The endgate 1 is unlatched from the closed position by the actuation of lift handle assembly 9 within bezel assembly 10. Latch rods 11 are translated toward the center of endgate 1 during the actuation of handle assembly 9 which in turn retract plungers 8 from their receivers thereby unlatching the endgate.

Figure 2:
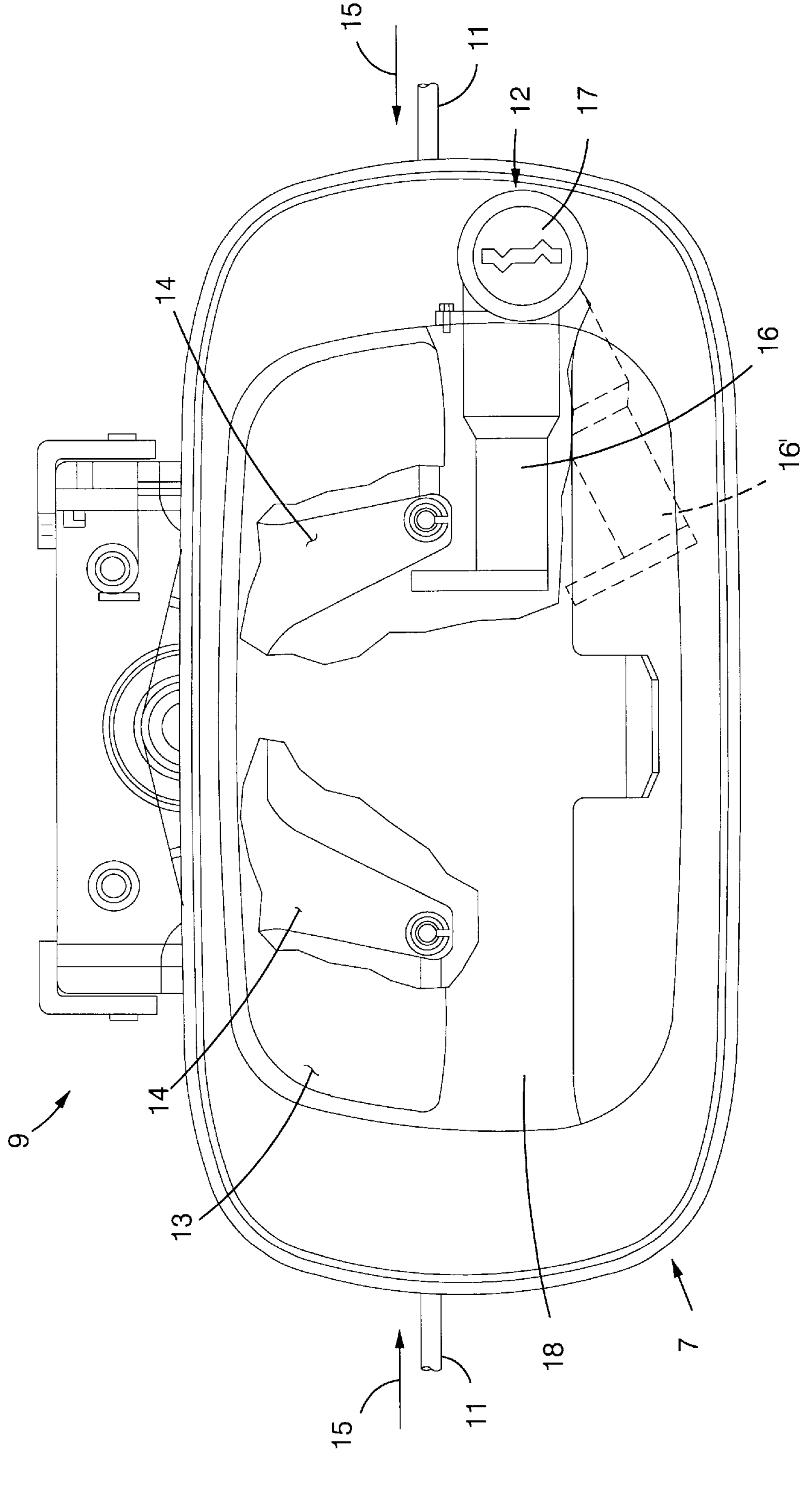
FIG. 2 is plan view in partial section of a lift handle assembly and a bezel assembly showing a locking device.
Figure 3:
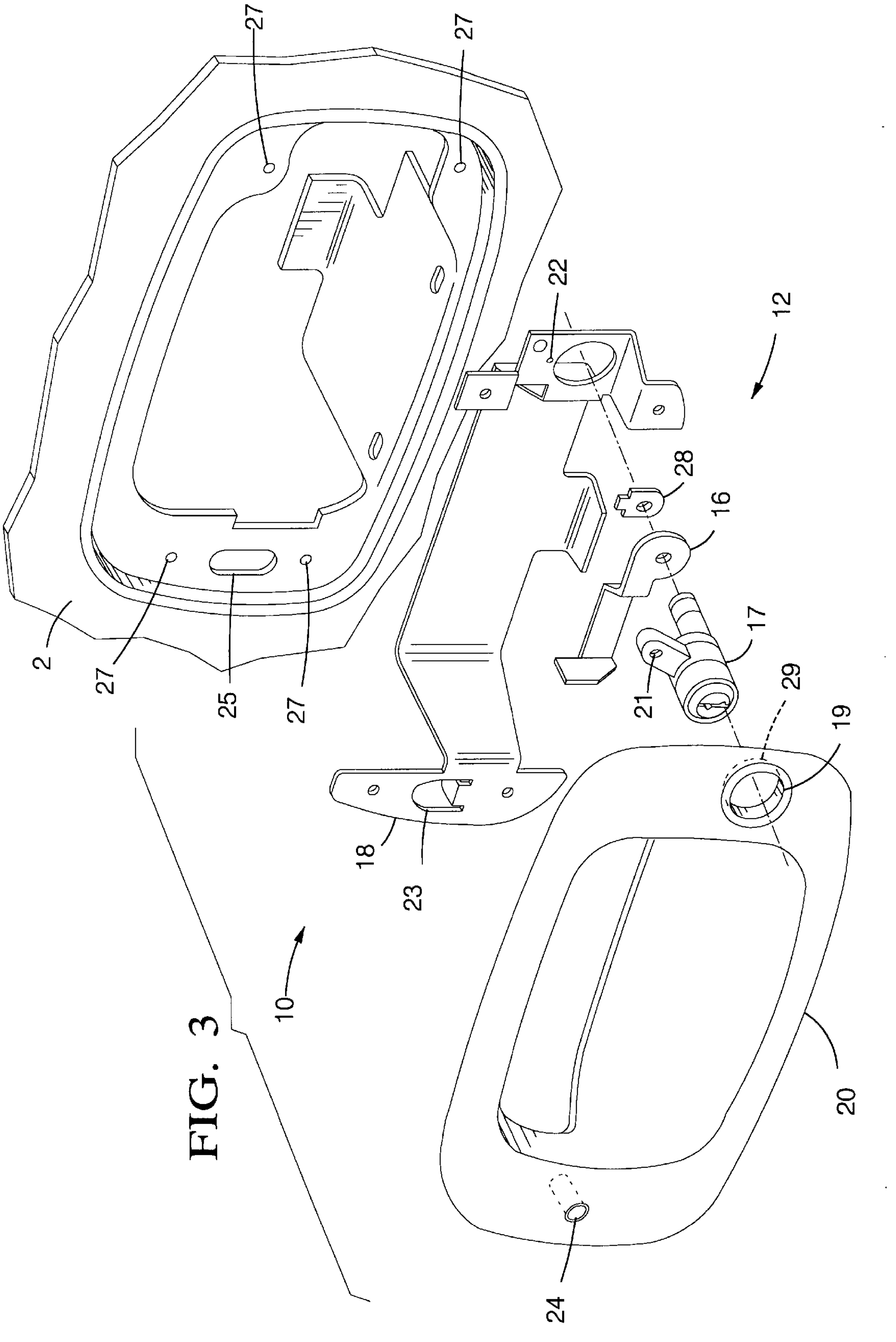
FIG. 3 is an isometric assembly view of a bezel, a locking mechanism, a close out plate, and an endgate.

In accordance with the present invention a locking mechanism, generally referred to as 12 is incorporated into handle assembly 9 and bezel assembly 10 as best shown in FIG. 2. Handle assembly 9 includes handle 13 and is well known in the art. As described herein above during operation of the handle assembly 9 of the prior art, handle 11 is lifted and handle pawls 14 move toward one another and displace latch rods 11 in the direction of arrows 14, 15 to release plungers 8 from their engagement thereby unlatching endgate 1 from the truck body. Locking mechanism 12 is shown in the engaged, or locked, position in FIG. 2 wherein locking pawl 16 is positioned to obstruct the movement of handle pawl 14 and thereby preventing the lifting of handle 13 and the unlatching of endgate 1. Locking pawl 16 is moveable between the locked position and the unlocked position represented by 16' by the insertion and rotation of a key (not shown) into lock cylinder 17. Also included in the present invention is close-out bracket 18 which covers locking pawl 16. It is interesting to note that the handle assembly 9 is spring biased (not shown) to return latching rods 11 in the direction opposite to that represented by arrows 15 and that the plungers 8 allow for subsequent closing of the endgate without movement of handle 13 upon closing. As such, the lockable endgate 1, beginning in a closed and locked position may be first unlocked by an operator, the handle 13 lifted and the endgate rotated to an open position. The operator may then immediately return the locking cylinder 17 and locking pawl 16 to the locked position. Upon subsequent closing of the endgate the handle 13 will be secured in a locked position. In the alternative, an operator may leave the lock cylinder 17 and locking pawl in an unlocked position for future keyless operation of the endgate As best shown in FIG. 3 locking mechanism 12 is advantageously well suited for retrofit or installation as an original equipment item as part of the bezel assembly shown generally as 10. Lock cylinder 17 of locking mechanism 12 is installed into, and protrudes partially through, mounting hole 19 in bezel 20 and is secured via a fastener (not shown) installed through fastener hole 21 into bezel 20. Locking pawl 16 is mounted to locking cylinder 17 by spring clip 28. Closeout bracket 18 is located onto bezel 20 by locating pin hole 22 and a respective male locating pin (not shown) on bezel 20 and locating hole 23 and locating pin 24. Locating pin 24 further locates the bezel assembly 20 into locating slot 25 in outer panel 2 of endgate 1. Bezel assembly 20 along with locking mechanism 12 and closeout bracket 18 are mounted to outer panel 2 via fasteners (not shown) installed through fasteners holes 27 engaged within bezel 20. An embodiment of the present invention further includes gasket 29 disposed between the locking cylinder 17 and the bezel 20.

Another important feature of the present invention is the ability to adapt locking cylinder 17 to engage the ignition key of the vehicle to eliminate the necessity of a separate key for the actuation of the lockable endgate 1.

It will be understood that a person skilled in the art may make modifications to the preferred embodiments shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A lockable endgate for a vehicle comprising:

an outer panel having a mounting hole disposed therein;

a lift handle assembly disposed in the mounting hole, the lift handle assembly releasably securing the endgate in a closed position and including a lift handle actuating a pair of handle pawls;

in operation the handle pawls translating a pair of latching mechanisms releasing the endgate from the closed position;

a bezel disposed on the outer panel having an access hole and an attachment hole with the lift handle extending partially through the access hole;

a key actuated locking cylinder disposed within the attachment hole of the bezel, the locking cylinder rotatable between a lock position and an unlock position; and a locking pawl coupled to the locking cylinder with the locking pawl prohibiting actuation of the lift handle assembly when in the lock position wherein, the bezel includes a locating pin and the outer panel includes a locating slot with the locating pin engaged in the locating slot, positively locating the bezel within the mounting hole.

2. A lockable endgate as set forth in claim 1 further comprising a closeout bracket positioned between the locking pawl and the bezel preventing direct access to the locking pawl.

3. A lockable endgate as set forth in claim 1 wherein the locking cylinder is actuated by an ignition key.

4. A bezel assembly for installation within a mounting hole of an endgate of a vehicle, the endgate including a lift handle assembly disposed in the mounting hole for releasably securing the endgate in a closed position, the lift handle assembly comprising a lift handle actuating a pair of handle pawls, the handle pawls translating a pair of latching mechanisms thereby releasing the endgate from the closed position, a bezel disposed on the outer panel having an access hole and the lift handle extending partially therethrough, the bezel assembly comprising:

a bezel having a recessed center area and a flange surrounding the recessed center area with a locating pin extending from the flange and with an attachment hole disposed in the flange;

a key actuated locking cylinder disposed within the attachment hole, the locking cylinder rotatable between a lock position and an unlock position;

a locking pawl coupled to the locking cylinder for engaging at least one of the handle pawls when in the lock position; and a closeout bracket extending across the recessed center area and including a first end engaging the flange on a first side of the recessed center area and including a second end engaging the flange on a second side of the recessed center area wherein the first end includes a locating hole with the locating pin extending through the locating hole and wherein the second end includes an opening with the locking cylinder extending through the opening.

5. A lockable endgate for a pick up truck comprising:

an outer panel exhibiting a mounting hole with a locating slot extending through the outer panel near the mounting hole;

a closeout bracket positioned in the mounting hole and including a locating hole with an adjacent tab, the locating hole aligned with the locating slot and the tab being extendable into the locating slot, and the closeout bracket including an opening;

a bezel having a locating pin extendable through both the locating hole and the locating slot for positive location of the bezel, and the bezel including an attachment hole;

a locking cylinder extending through the attachment hole and the opening of the bracket; and a locking pawl connected to the locking cylinder with the closeout bracket positioned between the bezel and the locking pawl so that the locking pawl is not directly accessible, wherein the outer panel extends to an opposite side of the closeout bracket from the bezel.

6. A lockable endgate for a pick up truck comprising:

a pair of hinges enabling rotation of the lockable endgate;

a pair of latch rods extending across the lockable endgate to fix the lockable endgate against rotation;

a handle actuating the pair of latch rods;

a lock including a locking pawl movable to prevent actuation of the pair of latch rods;

the lockable endgate including a mounting hole receiving the handle and including a slot positioned near the mounting hole;

a closeout bracket including a locating hole and being positioned in the mounting hole; and a bezel having a locating pin extending through both the locating hole and the slot.

7. A lockable endgate for a vehicle comprising:

an outer panel having a mounting hole with a locating slot positioned in a recessed part of the outer panel near the mounting hole;

a closeout bracket having a locating hole and positioned in the recessed part of the outer panel;

a bezel having an attachment hole and a locating pin and being positioned in the recessed part of the outer panel with the locating pin extending through the locating hole and the locating slot;

a locking cylinder positioned in the mounting hole and extending into the attachment hole of the bezel; and a locking pawl connected to the locking cylinder and positioned on an opposite side of the closeout bracket from the bezel so that access to the locking pawl is not achieved by removal of the bezel from the recessed part of the outer panel.

* * * * *